(12) United States Patent
Ogawa

(10) Patent No.: US 8,020,649 B2
(45) Date of Patent: Sep. 20, 2011

(54) LEGGED ROBOT

(75) Inventor: Akira Ogawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 669 days.

(21) Appl. No.: 12/160,324

(22) PCT Filed: Jan. 11, 2007

(86) PCT No.: PCT/JP2007/050228
§ 371 (c)(1),
(2), (4) Date: Jul. 9, 2008

(87) PCT Pub. No.: WO2007/080916
PCT Pub. Date: Jul. 19, 2007

(65) Prior Publication Data
US 2010/0000365 A1     Jan. 7, 2010

(30) Foreign Application Priority Data

Jan. 12, 2006  (JP) ................................ 2006-004900

(51) Int. Cl.
*B62D 57/32* (2006.01)
(52) U.S. Cl. .......................................... 180/8.5; 180/8.6
(58) Field of Classification Search ............... 180/8.1, 180/8.2, 8.5, 8.6; 318/568.12; 901/1
See application file for complete search history.

(56) References Cited

U.S. PATENT DOCUMENTS

| | | | |
|---|---|---|---|
| 912,108 A * | 2/1909 | Gaskill | .......................... 180/8.6 |
| 1,511,928 A | 10/1924 | Zboril | |
| 3,484,988 A | 12/1969 | Robbins | |
| 4,629,440 A | 12/1986 | McKittrick, Jr. et al. | |
| 4,834,200 A * | 5/1989 | Kajita | .............................. 180/8.1 |
| 5,159,988 A | 11/1992 | Gomi et al. | |
| 5,343,397 A | 8/1994 | Yoshino et al. | |
| 6,089,950 A | 7/2000 | Lee et al. | |
| 6,238,264 B1 | 5/2001 | Kazami et al. | |
| 6,243,623 B1 | 6/2001 | Takenaka et al. | |

(Continued)

FOREIGN PATENT DOCUMENTS

CN       1289665       4/2001

(Continued)

OTHER PUBLICATIONS

Office Action for Chinese Patent Application No. 2007800023552, dated Dec. 4, 2009.

(Continued)

*Primary Examiner* — Tony H. Winner
(74) *Attorney, Agent, or Firm* — Finnegan, Henderson, Farabow, Garrett & Dunner, LLP

(57) ABSTRACT

A legged robot that ensures a large step length while keeping the height of the trunk low is realized. The legged robot is provided with a trunk, a pair of legs, and a pair of sliding joints. Each of the sliding joints links one end of each of the legs to the trunk so as to slide in a front and rear direction with respect to the trunk. For each step, one leg is caused to slide forward, and the other leg is caused to slide backward. It is possible to ensure a predetermined distance between the end portion of the one leg and the end portion of the other leg. The legged robot can make the step length large by an amount that is equivalent to this distance irrespective of the length of the legs.

8 Claims, 3 Drawing Sheets

U.S. PATENT DOCUMENTS

| | | |
|---|---|---|
| 6,462,498 B1 | 10/2002 | Filo |
| 6,505,096 B2 | 1/2003 | Takenaka et al. |
| 6,583,595 B1 | 6/2003 | Hattori et al. |
| 2002/0022907 A1 | 2/2002 | Takenaka et al. |
| 2003/0173926 A1 | 9/2003 | Hattori et al. |
| 2006/0076167 A1* | 4/2006 | Setrakian et al. ............... 180/8.1 |
| 2009/0009124 A1 | 1/2009 | Suga et al. |
| 2009/0301798 A1* | 12/2009 | Yang et al. ..................... 180/8.6 |

FOREIGN PATENT DOCUMENTS

| | | |
|---|---|---|
| DE | 10032640 | 1/2002 |
| JP | 61-143266 | 6/1986 |
| JP | 62-149568 | 7/1987 |
| JP | 7-256579 | 10/1995 |
| JP | 11-500331 | 1/1999 |
| JP | 2000-355290 | 12/2000 |
| JP | 2002-160182 | 6/2002 |
| JP | 2003-80476 | 3/2003 |
| JP | 2003-266339 | 9/2003 |
| JP | 2004-105553 | 4/2004 |
| JP | 2005-52897 | 3/2005 |
| JP | 2005-161441 | 6/2005 |
| JP | 2005-186650 | 7/2005 |
| JP | 2005-297087 | 10/2005 |
| JP | 2007-185734 | 7/2007 |
| JP | 2007-229872 | 9/2007 |

OTHER PUBLICATIONS

Extended Search Report for EP Application No. 07706575.3, dated Jan. 13, 2010.
Japanese Office Action dated Dec. 9, 2008.
Extended European Search Report dated Feb. 19, 2010, for EP Appl. No. 07791469.5.
Replacement Supplemental EP Search Report dated Feb. 23, 2010 for EP Appl. No. 07706575.3.
Notification of Reasons for Rejection for JP 2006-207471 mailed Apr. 13, 2010.
Extended European Search Report for EP 10005405.5 dated Jul. 30, 2010.
Office Action mailed on Oct. 1, 2010 in U.S. Appl. No. 12/280,361.
First Office Action for Chinese Patent Appl. No. 201010159902.1, mailed May 25, 2011.

* cited by examiner

LEGGED ROBOT

CROSS-REFERENCE TO RELATED APPLICATION

This application claims priority to Japanese Patent Application No. 2006-4900, filed on Jan. 12, 2006, the contents of which are hereby incorporated by reference into the present application.

BACKGROUND OF THE INVENTION

1. Field of the Invention

The present invention relates to a legged robot. In particular, the present invention relates to a legged robot that can walk with long strides while maintaining the height of the trunk of the robot at a low position.

2. Description of the Related Art

Legged robots are known. A legged robot comprises a trunk and legs that are connected to the trunk. A typical legged robot comprises a pair of legs. Each of the legs comprises a plurality of link. Adjacent links are connected together by joints so as to be able to rotate. An actuator is provided in each of the joints. Each of the links of the legs is driven by the actuator and rotates relatively to the adjacent link. The legged robot can walk by controlling the actuators of the respective legs so as to move each of the links of the legs appropriately. Such a legged robot is disclosed in Japanese Patent Application Publication No. 2005-186650 (referred to as Patent Document 1 below). The legged robot disclosed in Patent Document 1 comprises a pair of legs and a trunk in which a rider rides. Each of the legs is connected to the trunk so as to be able to rotate by rotating joints that are disposed below the trunk. The rotation axis of the joints extends along the lateral direction of the trunk. The legged robot disclosed in Patent Document 1 walks while each of the pair of legs is swung alternately back and forth in regard to the trunk. Each of the pair of the legs swings pivoted with the rotation axis of the rotation joint that are disposed below the trunk.

BRIEF SUMMARY OF THE INVENTION

In order to move fast, a legged robot preferably walks with long strides. At the same time, in order to walk stably, height of the trunk being low is preferable. In the legged robot disclosed in Patent Document 1, the pair of legs is connected to bottom of the trunk by rotating joints that are provided below the trunk. Such legged robot walks by alternately swinging the pair of legs in a back and forth direction with each leg being pivoted at the rotation axis of the rotating joints that are positioned below the trunk. Therefore, in order to increase the length of strides, the total length of each leg must be elongated. However, the longer length of legs causes the height of the trunk to be higher, because each of the legs is connected under the trunk by the rotating joints. Alternatively, when the total length of each leg is made short in order to make the height of the trunk lower, the length of strides becomes short. In the technology disclosed in Patent Document 1, it is difficult to realize a legged robot providing both the larger length of stride and the lower height of the trunk. A technology that realizes a legged robot having a longer stride without raising the height of the trunk is desired.

The legged robot disclosed in the present specification uses sliding joint in order to make the step length large. In the present specification, the sliding joint connects a leg to the side surface or the bottom surface of a trunk. Specifically, the legged robot disclosed in the present specification has a trunk, a pair of legs, and a pair of sliding joints. Each of the sliding joints connects one end of each of the legs to the trunk such that each of the legs is able to slide back and forth in a front and rear direction with respect to the trunk. Each of the sliding joints of each of the legs may be arranged on either side surface of the trunk, or may be arranged on the bottom surface of the trunk. In the former case where each of the sliding joints is disposed on either side of the trunk, each of the sliding joints connects each of the legs to the trunk at the respective body side surfaces. In the latter case where the pair of sliding joints is disposed at the bottom of the trunk, each of the sliding joints connects each of the legs to the trunk at the bottom surface of the trunk. Each of the sliding joints extends in the front and rear direction with respect to the trunk. Note that the number of pair of legs and corresponding number of pair of sliding joints that are provided on the legged robot may be one pair or more.

Each of the sliding joints can slide each of the legs along the front and rear direction of the trunk. This legged robot slides the pair of legs alternately back and forth along the front and rear direction while walking. Thus, the end portions of both legs (the end portions on the sides that are connected to the trunk), which are connected to the sliding joints, move back and forth alternately with a predetermined length in a front and rear direction. Even in a case where the present legged robot having the same leg-length as the conventional legged robot in which each of the legs is connected to the trunk by a rotating joint, the predetermined step length of the present legged robot can be made longer than that of the conventional legged robot due to the increase in the distance to which the ends of each legs reach in their strides in the front and rear direction. The legged robot disclosed in the present specification can make the stride length of the legged robot large without elongating the entire length of the legs. By the employment of sliding joint, it is possible to realize a legged robot having a long stride without increasing the height of the trunk.

In a case where the contour of the trunk has a form rounded, like an egg, the bottom, back, and side surfaces of the trunk are difficult to distinguish. In this case, the expression "bottom surface of the trunk" in the present specification would mean "a surface of the trunk which faces towards the ground".

In a case where the sliding joints are provided on the bottom surface of the trunk, at least a part of each sliding joints extend in the front and rear direction at least within the bottom surface. The sliding joints may further extend beyond the bottom surface, to the front surface or the back surface of the trunk.

Furthermore, the expression "the sliding joint extends in a front and rear direction with respect to the trunk" means that a projection line projecting the tangential line of the sliding joint on a horizontal plane extends in the aforesaid front and rear direction. The sliding joints may extend with angle with respect to the horizontal direction. Alternatively, the sliding joint may be curved.

Preferably, each of the sliding joints curves so as to project below the trunk (vertically below the trunk). The expression "curve so as to project below the trunk" means that the center of curvature that defines the curve of the sliding joint is positioned above the sliding joints. In other words, preferably the sliding joint curves such that the lowest point of the curve is positioned between the ends of the sliding joint.

Each of the curved sliding joints may be shaped in a succession of different curved lines. Here, "different curved lines" means that plural curved lines have different centers of curvature, or means that plural curved lines have different radii of curvature. In a case where each of the curved sliding joints is shaped with the succession of different curved lines, the center of curvature of each of the curved lines may be positioned above the sliding joint.

When each of the sliding joints curves so as to project downward below the trunk (vertically downward below the trunk), the top end portion of each of the legs (the end portion connected to the sliding joint) moves while describing an arc around the center of curvature. Even though the legs are connected to the trunk by the sliding joints, the legs swing as if they are connected by rotation joints at the center of curvature. Due to such a configuration, the movement of the legs can be made smooth while walking. It is possible to make the motion of the legged robot smooth while walking.

Each of the curved sliding joints may also be shaped with a single arc. When each of the sliding joints curves along a single circular arc, among the joints of each leg, a first joint (the joint that is nearest to the sliding joint) swings pivoted at the center of curvature of the single circular arc. The kinematical relationship between the trunk and each of the legs is equivalent to that of a structure in which an imaginary rotating joint having a rotation axis that passes through the center of curvature of the single circular arc and the first joint are connected by an imaginary link. Therefore, although the trunk and the legs are actually connected by sliding joints, the calculation of the forward kinematics and the inverse kinematics can be carried out on the assumption that the legs and the trunk are connected by imaginary rotating joints and imaginary links. In a multi-joint robot, the calculation of the forward kinematics and the inverse kinematics is simpler for a robot that is structured solely by rotating joints than for a robot that is structured by rotating joints and sliding joints. Due to the structure described above, it is possible to simplify the calculation of the forward kinematics and the inverse kinematics of the legs even though sliding joints are provided.

Preferably, the center of curvature of each of the curved sliding joints is positioned above the center of mass of the trunk. In a case where the legs slide along sliding joints, geometrically the legs and the trunk rotate relatively around the center of curvature of the sliding joints. Due to the gravitational force that acts on the center of mass of the trunk, a moment is generated around the center of curvature. This moment acts so as to position the center of mass of the trunk vertically below the center of curvature. In a case where the legs freely slide along the curved sliding joints, the trunk is stabilized with its center of mass located at a position vertically below the center of curvature. Here, the center of curvature means the center of rotation of the trunk. By positioning the center of curvature above the center of mass of the trunk, it is possible to make the trunk more invulnerable against overturning. Even in a case where the legged robot is significantly inclined in the front and rear direction due to some cause, it is possible to prevent the trunk from overturning by allowing free movement of the legs at the sliding joints. It is possible to improve the stability of the trunk. Note that the expression "allowing free movement of the legs at the sliding joints" means a condition in which neither a drive force that causes the legs to slide nor a braking force that keeps the position of the legs on the sliding joints is applied to the actuators of the sliding joints.

Preferably, in the legged robot, in addition to the center of curvature of the sliding joints being positioned above the center of mass of the trunk, the trunk is provided with a seat in which a rider can be seated. In this case, preferably a seat base of the seat is positioned below (vertically below) the center of curvature.

Generally, it is known that in the state in which a rider is sitting in a seat, the center of mass of the rider is positioned in the vicinity of his/her hips. Therefore, by positioning the seat base vertically below the center of curvature of the sliding joints, it is possible to locate the center of mass of the seated rider vertically below the center of curvature of the sliding joints. In combination with the center of curvature being positioned vertically above the position of the center of mass of the trunk, it is possible to set the center of mass of the trunk including the seated rider to be vertically below the center of curvature of the sliding joints. It is possible to prevent the trunk in which a rider is seated from overturning.

According to the technology disclosed in the present specification, it is possible to realize a legged robot that walks with long strides without increasing the height of the trunk of the robot.

DETAILED DESCRIPTION OF THE INVENTION

Figure 1A:
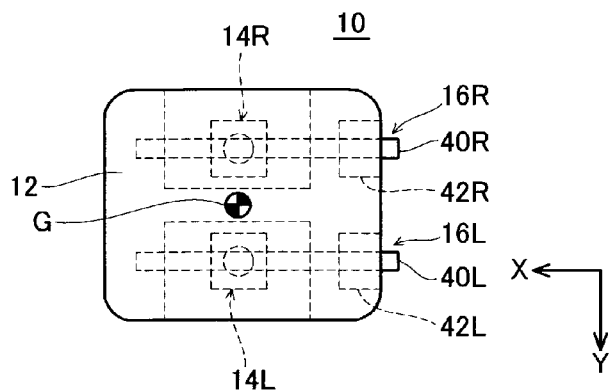
FIG. 1 (A) shows a plan view, (B) shows a side view, and (C) shows a back view of a legged robot of a first embodiment.

Configurations corresponding to the Reference numerals used in the drawings will be described below.
10,10a: Legged Robot
12, 13: Trunk
14L, 14R: Legs
16L, 16R: Sliding Joints
20L, 20R: First Links
22L, 22R: Second Links
24L, 24R: Third Links
24La, 24Ra: End Portions of Third Links
26L, 26R: First Combined Joints
28L, 28R: Second Combined Joints
30L, 30R: First Roll Joints
32L, 32R: First Pitch Joints
34L, 34R: Second Roll Joints
36L, 36R: Second Pitch Joints
40L, 40R: Guide Rails
42L, 42R: Actuators
60: Seat
60a: Seat Base
100: Rider Preferred technical features of the embodiments will be listed.
(1) Sliding joints are located at a bottom surface of a trunk. When the legged robot is in a standing posture, each of roll joints provided in legs is disposed within the width of the trunk in the lateral direction (traverse direction). Note that the expression "standing posture" means the attitude in which the center of mass of the trunk, and the joint corresponding to a human knee joint, and the joint corresponding to a human ankle joint of legs are aligned along with a vertical line when viewed from the lateral direction with respect to the robot. The "roll joint" denotes a joint of which the rotation axis extends along a front and rear direction of the trunk (the robot).
(2) The centers of curvature of the pair of sliding joints are aligned on a line extending in a lateral direction with respect to the trunk.

First Embodiment

Figure 1B:
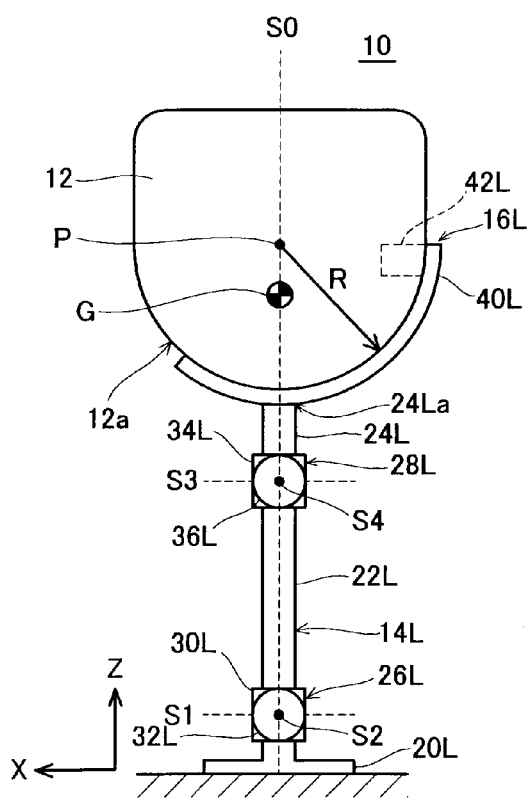
Figure 1C:
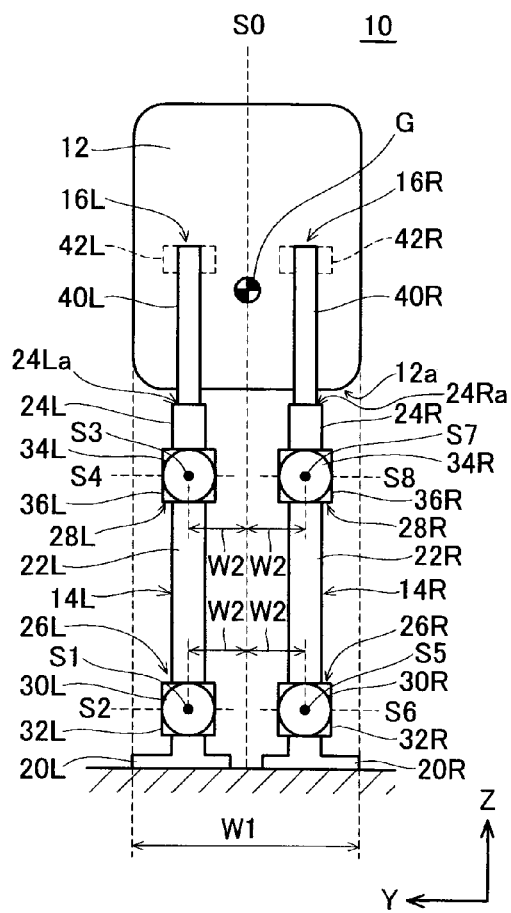

A first embodiment of the legged robot will be explained with reference to the figures. FIG. 1 shows a plan, side, and back view of a legged robot 10. In FIG. 1, (A) shows the plan view, (B) shows the side view, and (C) shows the back view of the legged robot 10.

This legged robot 10 has a trunk 12 and a pair of legs 14L and 14R. The leg 14L corresponds to the left leg of a human body. The leg 14R corresponds to the right leg of the human body. A sliding joint 16L is provided on a bottom surface 12a of the trunk 12. The sliding joint 16L slidably connects one end 24La of the leg 14L to the trunk. Similarly, a sliding joint 16R is provided on the bottom surface 12a of the trunk 12. The sliding joint 16R slidably connects one end 24Ra of the leg 14R to the trunk 12.

In the coordinate system shown in FIG. 1, the positive direction shown with the axis arrow of the X-axis corresponds to the front of the legged robot 10 (the trunk 12). The direction that is parallel to the Y-axis corresponds to the side direction of the legged robot 10 (the trunk 12). The direction parallel to the Y-axis may also be referred to as a "lateral direction" or "transverse direction" of the legged robot 10 (the trunk 12). The direction of the Z-axis corresponds to the up and down direction with respect to the legged robot 10 (the trunk 12). Note that the direction of the Z-axis also corresponds to a "vertical direction".

First, the legs 14L and 14R will be explained. The leg 14L is structured by a plurality of links 20L, 22L, and 24L and a plurality of rotation joints 30L, 32L, 34L, and 36L.

The left first link 20L configures an end portion on the ground side of the leg 14L. The left first link 20L corresponds to the foot of the human body. The left first link 20L and the left second link 22L are connected by a left first combined joint 26L. The left second link 22L corresponds to the lower leg (calf) of the human body. The left first combined joint 26L corresponds to the ankle joint of the human body.

The left first combined joint 26L is structured by the left first roll joint 30L and the left first pitch joint 32L. The left first roll joint 30L rotates the left first link 20L around a roll axis S1 in respect to the left second link 22L. The left first pitch joint 32L rotates the left first link 20L around a pitch axis S2 in respect to the left second link 22L. Due to the left first combined joint 26L, the left first link 20L can rotate relative to the left second link 22L in two directions: around the roll axis S1 and around the pitch axis S2.

Here, the term "roll axis" denotes an axis that substantially extends in a front and rear direction of the legged robot 10. In addition, the term "pitch axis" denotes an axis that substantially extends in the lateral direction of the legged robot 10. When each of the links of the leg 14L swings, the directions of the rotation axes of the joints also change. Therefore, in this context, the expressions "substantially in a back and forth direction" and "substantially in the lateral direction" are used.

The left second link 22L and the left third link 24L are connected by a left second combined joint 28L. The left third link 24L corresponds to the thigh when compared to the human body. The left second combined joint 28L corresponds to the knee joint when compared to the human body.

The left second combined joint 28L is structured by the left second roll joint 34L and the left second pitch joint 36L. The left second roll joint 34L rotates the left second link 22L around the roll axis S3 in respect to the left third link 24L. The left second pitch joint 36L rotates the left second link 22L around the pitch axis S4 in respect to the left third link 24L. Due to the left second combined joint 28L, the left second link 22L can rotate relative to the left third link 24L in two directions: around the roll axis S3 and around the pitch axis S4.

Motors (actuators) and rotary encoders are built into each of the joints 30L, 32L, 34L, and 36L. The motors and the encoders are not shown in FIG. 1. Each of the motors generates a torque for relatively rotating the links that are adjacent to the respective joints. Each of the rotary encoders detects the relative rotation angle between the links that are adjacent to the respective joints.

The structure of the leg 14R is similar to the structure of the leg 14L. For example, the left first link 20L of the leg 14L corresponds to a right first link 20R of the leg 14R. Similarly, among the reference numerals that are given to each of the parts of the leg 14L and the leg 14R, parts with identical numbers represent corresponding parts. The corresponding relationships between the pitch axes and the roll axes of the leg 14L and leg 14R are as follows. The roll axis S1 and the roll axis S3 of the leg 14L respectively correspond to a roll axis S5 and a roll axis S7 of the leg 14R. The pitch axis S2 and the pitch axis S4 of the leg 14L respectively correspond to a pitch axis S6 and a pitch axis S8 of the leg 14R.

Motor (not illustrated) and rotary encoder (not illustrated) are also built into each of the joints 30R, 32R, 34R, and 36R of the leg 14R. The motor generates a torque for relatively rotating the links that are adjacent to the joint. The rotary encoder detects the relative rotation angle between the links that are adjacent to the joint.

Next, the sliding joints 16L and 16R will be explained. The sliding joint 16L is a joint that connects the leg 14L to the trunk 12 so as to be able to slide the leg 14L relatively to the trunk 12. The sliding joint 16L includes a guide rail 40L and an actuator 42L. The guide rail 40L is laid out along the bottom surface 12a of the trunk 12. As shown in FIG. 1, the bottom surface of the trunk 12 curves so as to project downward when viewed from the lateral direction. Therefore, the guide rail 40L correspondingly curves so as to project downward, while extending in the front and rear direction of the trunk 12. The position of the center of curvature of the curved guide rail 40L is shown by the reference symbol P in FIG. 1 (B). The guide rail 40L defines a curve having a curvature radius R with respect to the position P. In other words, the guide rail 40L curves along a circle that is centered at the position P and that has a radius R. In addition, as shown in FIG. 1 (B), the guide rail 40L curves such that the center of curvature is positioned above the position of the slide rail 40L.

The end portion 24La of the left third link 24L is slidably connected to the guide rail 40L so as to be able to slide along the guide rail 40L. The end portion 24La of the left third link 24L is equivalent to an end portion of the leg 14L. Since the end portion 24La of the left third link 24L is slidably connected to the guide rail 40L, thus the entire leg 14L can slide along the guide rail 40L of the sliding joint 16L.

The actuator 42L outputs a drive force that causes the leg 14L to slide along the guide rail 40L. With the operation of the actuator 42L, the leg 14L is positioned at an arbitrarily selected position along the guide rail 40L. The sliding joint 16L includes a position detector (not illustrated). This position detector detects the position at which the end portion 24La of the leg 14L is located within the guide rail 40L.

Further explanation on the detailed mechanism of the sliding joint 16L will be omitted. However, the mechanism thereof can be realized by using, for example, a linear motion mechanism that is used in a single axis stage. A rail of such a linear motion mechanism is normally straight. Therefore the straight rail may be modified to curve while applying the linear motion mechanism to the robot 10.

The sliding joint 16R is a joint that slidably connects the leg 14R to the trunk 12. The structure of the sliding joint 16R is similar to the sliding joint 16L, and thus the explanation thereof will be omitted. Note that a guide rail 40R of the sliding joint 16R also curves along a circular arc with a radius R. The position of the center of the circular arc defined by the curved guide rail 40L of the sliding joint 16L and the position of the center of the circular arc defined by the curved guide rail 40R of the sliding joint 16R coincide at the position P when viewed from the lateral direction. In other words, the center of curvature of the curved the sliding joint 16L and the center of curvature of the curved sliding joint 16R align on a straight line extending along the lateral direction of the trunk 12.

In addition to the sliding joints 16L and 16R, controller (not illustrated) that controls the legged robot overall is mounted in the trunk 12.

There may be a case where a seat for carrying a rider, which will be described later, is provided in the trunk 12, and also a case where a pallet for loading cargo is provided in the trunk 12. In addition, there may be a case where a manipulator for carrying out various operations is mounted on the trunk 12.

Among the other reference symbols shown in FIG. 1, G denotes the position of the center of mass of the trunk 12, and W1 denotes the width of the trunk 12 (the lateral length of the trunk 12). Symbol S0 denotes a vertical line passing through the position G of the center of mass of the trunk. Symbol W2 denotes the distance in the lateral direction between the vertical line A0 and the respective rotation axes S1, S3, S5, and S7 of the respective roll joints 30L, 34L, 30R, and 34R. The relationship among the position G of the center of mass, the width W1 of the trunk 12, and the distance W2 between the vertical line S0 and each of the roll axes will be explained later in detail.

Note that the posture of the legged robot 10 shown in FIG. 1 will be referred to as the "standing posture". As shown in FIG. 1 (B), the term "standing posture" refers to the attitude where the position G of the center of mass of the trunk 12, the joints 28L and 28R which correspond to human knee joints, and the joints 26L and 26R which correspond to human ankle joints align on the vertical line S0, a substantially straight line in the vertical direction, when viewed from the lateral direction.

Figure 2:
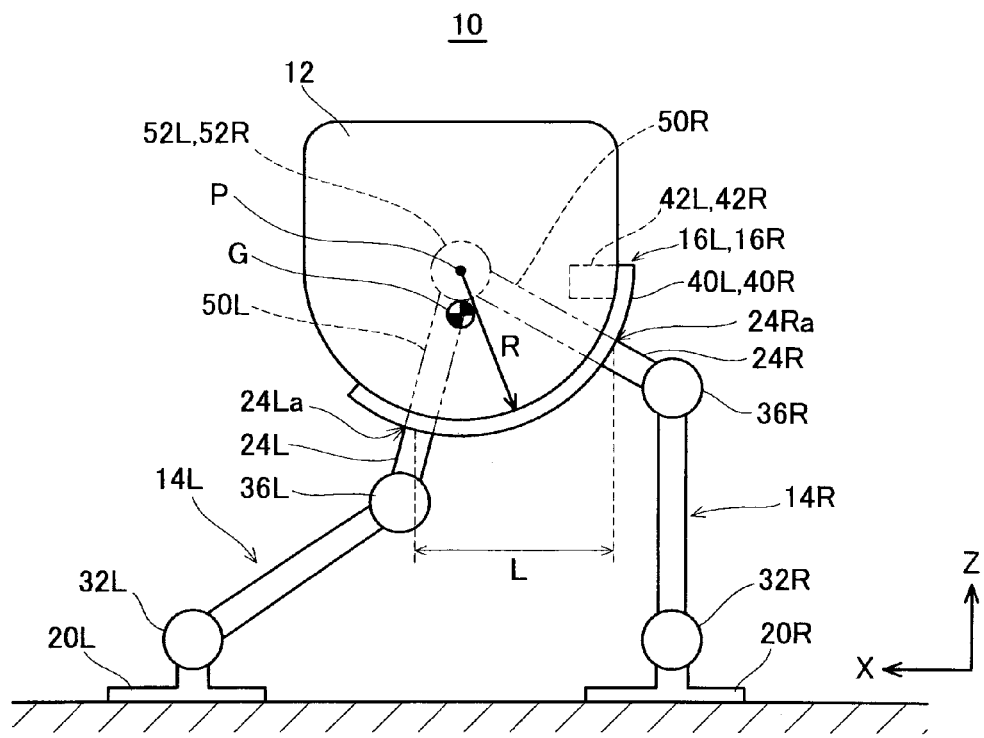
FIG. 2 shows a side view of the legged robot while walking.

Next, the motion of the legged robot 10 of the present embodiment while walking will be explained with reference to FIG. 1 and FIG. 2. FIG. 2 is a side view of the legged robot 10 taking a step forwarding one leg 14L along the X-axis direction. In FIG. 2, the "forwarding direction" or "forward direction" corresponds to the positive direction of the X-axis. The explanation below will focus on the motion of the legs 14L and 14R in the XZ plane while advancing straight forward in the direction along the X-axis. In the below explanation, it is assumed that the roll axis joints 30L, 34L, 30R, and 34R of the respective legs 14L and 14R do not rotate while advancing straight forward. Therefore, the first roll joint 30L in the first combined joint 26L and the second roll joint 34L in the second combined joint 28L in the leg 14L are omitted in FIG. 2. Similarly, the first roll joint 30R in the first combined joint 26R and the second roll joint 34R in the second combined joint 28R in the leg 14R are omitted in FIG. 2.

The actuators (not illustrated) for rotating the links are built into each of the joints 32L, 36L, 32R, and 36R of the legs 14R and 14L. In the sliding joint 16L, the actuator 42L is provided for sliding (moving) the end portion 24La of the leg 14L along the guide rail 40L to a position that is to be arbitrarily selected. Similarly, the actuator 42R is also provided in the sliding joint 16R, for sliding the end portion 24Ra of the leg 14R along the guide rail 40R.

The position of the leg 14L on the guide rail 40L is detected by a position detector (not illustrated) that is provided in the sliding joint 14L. Similarly, the position of the leg 14R on the guide rail 40R is detected by the position detector (not illustrated) that is provided in the sliding joint 14R. Rotary encoder (not illustrated) is also provided in each of the rotating joints that are respectively provided in the legs 14L and 14R. The joint angles that are detected by the rotary encoder and the positions of the legs 14L and 14R within the guide rails 40L and 40R, which are detected by the respective position detectors, are input to the controller (not illustrated) of the legged robot 10. The controller outputs command to each of the actuators such that each of the joints is appropriately controlled by a predetermined control logic based on the input values. As a result, each of the links of the legs 14L and 14R are cooperatively moved, thus enabling the legged robot 10 to walk.

As shown in FIG. 2, when the legged robot 10 takes a motion where the leg 14L steps out forward, the end portion 24La of the leg 14L is slid (moved) forward with respect to the trunk 12 along the guide rail 40L. Simultaneously, the end portion 24Ra of the leg 14R is slid (moved) backward with respect to the trunk 12 along the guide rail 40R. As a result, a distance L is produced between the end portion 24La of the leg 14L and the end portion 24Ra of the leg 14R in the front and rear direction with respect to the trunk 12.

Unlike the legged robot 10, a conventional legged robot whose legs are connected to the trunk by rotating joints as in the human hip joint cannot displace the connecting portion of the legs and the trunk in the front and rear direction. Therefore, the step length of such a conventional legged robot is restricted by the entire length of the leg from the connection portion of the leg and the trunk to the foot. In the explanation hereof, note that the restriction of the step length that binds the legged robot under the condition of being able to walk without overturning is ignored. In contrast to the aforesaid conventional legged robot, the legged robot 10 of the present embodiment is able to comprise the distance L between the end portion 24La of the leg 14L and the end portion 24Ra of the leg 14R in the front and rear direction of the trunk 12. As a result, the legged robot 10 is able to elongate the length of each stride longer than the length of stride that is defined by the length of the legs 14L and 14R. The length of the stride can be elongated within the additional length that can be gained by the distance L. The legged robot 10 of the present embodiment can increase the step length without increasing the total length of the legs. In other words, the legged robot 10 can walk with strides longer than the conventional robot while keeping the height of the trunk 12 low.

Hereinafter, the leg 14L will be explained. The leg 14R is similar, and thus the explanation thereof will be omitted. The guide rail 40L of the sliding joint 16L is curved so as to describe an arc with a certain radius of curvature being centered on a position P that is located above the guide rail 40L. In other words, the guide rail 40L of the sliding joint 16L curves so as to project downward (vertically downward with respect to the trunk 12). The end portion 24La of the leg 14L slides along the curve of the guide rail 40L. The legged robot 10 can walk by smoothly moving the leg 14L by the motion of the end portion 24La of the leg 14L sliding back and forth along the sliding joint 16L projecting downward. Note that hereinafter, the term "vertically downward" is simply expressed as "downward".

Particularly in the legged robot 10 of the present embodiment, the guide rail 40L is curved along a perfect circle that is centered on the single position P. The circular arc that the guide rail 40L defines extends in the front and rear direction of the trunk 12. Therefore, the kinematical relationship in the connecting configuration of the leg 14L and the trunk 12 via the sliding joint 16L is equivalent to the following configuration: that is, a configuration assuming that an imaginary rotating joint 52L having a rotation axis that extends along the pitch direction (the Y-axis direction) and that passes through the position P in the trunk 12 is provided, and the imaginary rotating joint 52L and the left second pitch joint 36L are connected by an imaginary link 50L, of which the left third link 24L is extended towards the position P. Hence, the legged robot 10 of the present embodiment is equivalent to a configuration in which the leg 14L having the imaginary link 50L and the trunk 12 are connected by the imaginary rotating joint 52L being positioned at the position P. Therefore, the legged robot 10 is able to materialize a walking stride equivalent to the walking stride materialized by leg having the imaginary rotating joint 52L and imaginary link 50L. In other words, the legged robot 10 of the present embodiment can walk with the same step length as that of a legged robot having a leg-length corresponding to the length from the left first link 20L to the imaginary joint 52L.

Note that a legged robot having actual joints at the position P of the trunk 12 is not practical. As shown in FIG. 1 (C), the leg 14L is connected to the trunk 12 by the sliding joint 16L below the bottom surface 12a of the trunk 12. To realize the joint 52L that has a rotation axis at the position P, the joint will be disposed inside the trunk 12. Furthermore, a certain space must be secured under the joint in which the link 50L may swing. Thus, there is substantially no space left in which other apparatuses may be installed beneath the position P of the trunk 12. Such a legged robot is actually identical to a robot in which the bottom portion of the trunk is located at the position P. This means that, in a conventional robot, if the position of the hip joint is to be located at the position P, the height of the trunk must be made taller.

In contrast, in the legged robot 10 of the present embodiment, the actual leg 14L is connected to the trunk 12 by the sliding joint 16L at the bottom surface 12a of the trunk 12. It is not necessary to dispose the leg 14L inside of the trunk 12. With the aforesaid configuration, the legged robot 10 can take a larger step length without making the height of the trunk 12 any taller.

Furthermore, as shown in FIG. 1 (C), the leg 14L of the legged robot 10 is connected by the sliding joint 16L at the bottom surface 12a of the trunk 12. Thereby, it is possible to shorten the distance W2 in the lateral direction between the vertical line S0 that passes through the position G of the center of mass of the trunk 12 and the roll axes S1 and S3 of the roll joints 30L and 34L that are possessed by the leg 14L. The following effects are obtained by shortening the distance W2.

In a legged robot, particularly in a legged robot which walks by using a pair of legs, when the robot stands using only one leg, trunk of the robot must be supported by the only one leg that is in contact with the ground. In such a case where only one leg is in contact with the ground, a moment acts on the roll joint(s) of the supporting leg due to the trunk's own weight. The magnitude of the moment is proportional to the distance between a vertical line that passes through the position of the center of mass of the trunk and the rotation axis of the roll joint(s). In regards to this point, the leg 14L of the legged robot 10 is connected to the trunk 12 at the bottom surface 12a of the trunk 12. Therefore, as shown in FIG. 1 (C), when the legged robot 10 stands straight, each of the roll joints 30L and 34L that are provided in the leg 14L is positioned within the width w1 of the trunk 12 in the lateral direction. Thereby, the legged robot 10 succeeds in maintaining the distance W2 in the lateral direction small. As a result, the legged robot 10 is able to control the moment that acts on the roll joints 30L and 34L of the leg during a one-leg contact with the ground to be small. The legged robot 10 can make the moment acted to the roll joints of the leg that is in contact with the ground small when in the one-leg standing state by providing the slide joints 16L and 16R on the bottom surface 12a of the trunk 12. Thus, it is possible to employ in the roll joints a motor whose output torque is small.

As described above, in spite that the legged robot 10 has a structure in which the leg 14L and the trunk 12 are connected by a sliding joint 16L, this structure is kinematically equivalent to a structure in which the leg 14L including the imaginary link 50L and the trunk 12 are connected by the imaginary rotating joint 52L that is positioned at the position P. Generally in a multi-joint robot, the computational conversion of respective joint angles into coordinates of an end position of the multi-joint robot (such conversion referred to as positive kinematics or forward kinematics), and the computational conversion of coordinates of the end position of the multi-joint robot into the respective joint angles (such conversion referred to as inverse kinematics) are simpler in the case of multi-joint robot having only rotating joints than in the case of multi-joint robot having both sliding joints and rotating joints. In particular, as in the case of the sliding joints of the legged robot 10, where a legged robot has a joint that slides along a curve, more computational efforts are required for the more-complex forward kinematics and inverse kinematics. To control the legged robot 10 of the present embodiment, the calculation for the forward kinematics or the inverse kinematics must be carried out in regards to the position of the foot-end and the end portion 24La of the leg 14L, and, to joint angles of the respective rotating joints. In a case of the legged robot 10, the sliding joint 16L can be assumed to be replaced by the imaginary rotating joint 52L that is disposed at the position P and the imaginary link 50L in terms of executing the converting calculation of the forward and inverse kinematics. In other words, it is possible to carry out the calculations of the forward kinematics and the inverse kinematics on the assumption that the trunk 12 and the leg 14L are connected by the imaginary rotating joint 52L. Even though the sliding joint 16L is actually materialized, the processes of the forward kinematics and the inverse kinematics can be carried out employing the simple calculation.

Next, the relationship between the position G of the center of mass of the trunk 12 and the position P of the center of curvature of the curved sliding joint 16L will be explained. As shown in FIG. 1 (B), the position P is allocated above the position G of the center of mass of the trunk 12. As formerly explained, the kinematical relationship between the trunk 12 and the leg 14L of the legged robot 10 is equivalent to a structure in which the leg 14L including the imaginary link 50L and the trunk 12 are connected by the imaginary rotating joint 52L that is disposed at the position P. Therefore, when the sliding joints 16L and 16R are in a free state, that is, a state in which the end portions 24La and 24Ra of the legs 14L and 14R can move freely along the respective guide rails 40L and 40R, the trunk 12 attains an attitude in which the position G is positioned vertically below the position P due to the gravitational force. Alternatively, if the position P of the center of curvature of the guide rails 40L and 40R were allocated below the position G and the sliding joints 16L and 16R are set in the free state, a gravitational force acts on the trunk 12 that forces the position G of the center of mass of the trunk 12 to move to the position vertically below the position P. As its result, the trunk 12 would overturn. The legged robot 10 has the following advantage by allocating the position P of the center of curvature of the curved guide rails 40L and 40R above the position G of the center of mass of the trunk 12: in a case where the angle of inclination toward either the front or rear direction of the legged robot 10 increases due to some reason, the legged robot 10 can prevent the trunk 12 from overturning by allowing the sliding joints 16L and 16R to be in the free state. This advantage can be also achieved in a case where each of the guide rails 40L and 40R is shaped with different curved lines succeeding each other. In this case, each center of the respective curved lines are preferably positioned above the position G of the center of mass of the trunk 12.

Second Embodiment

Figure 3:
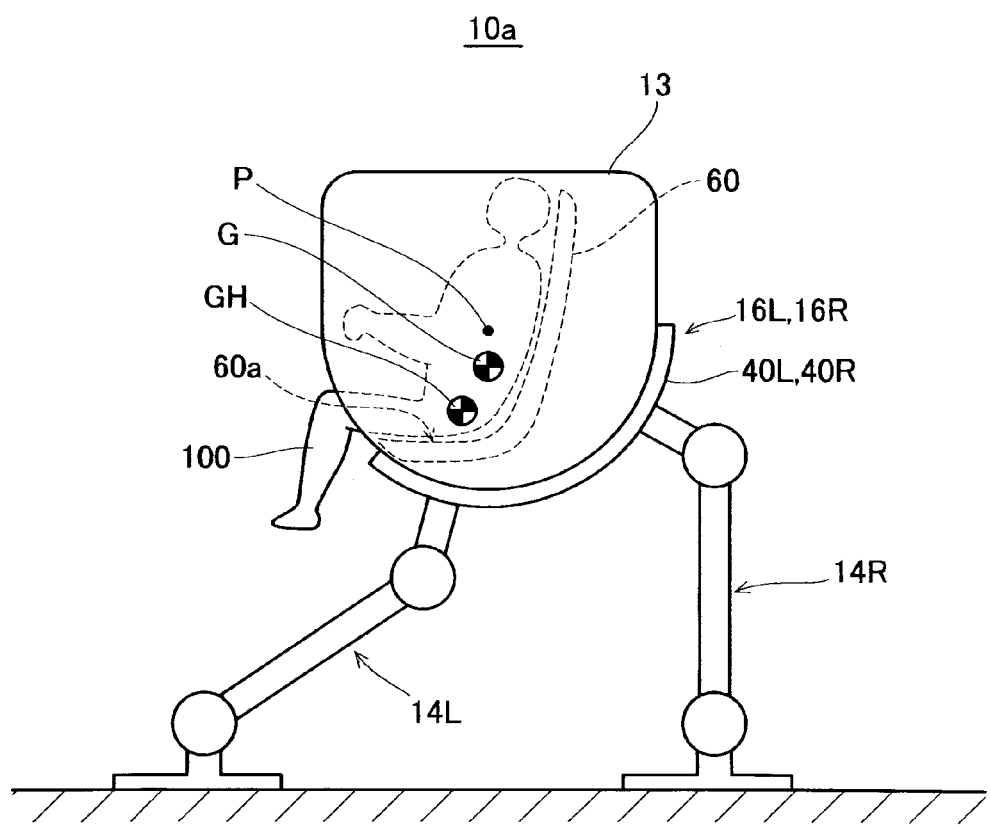
FIG. 3 shows a side view of a legged robot of a second embodiment.

Next, a legged robot 10a according to a second embodiment will be explained. The legged robot 10a that is shown in FIG. 3 has a seat 60 inside a trunk 13, in which a rider 100 can be seated. This legged robot 10a is an on-board type of legged robot which walks while carrying a rider. The legs 14L and 14R and the sliding joints 16L and 16R are configured the same as those of the legged robot 10 in FIG. 1, and thus the explanation thereof will be omitted. Other than being provided with the seat 60, the trunk 13 is configured the same as the trunk 12 that is shown in FIG. 1, and thus the explanation thereof will also be omitted.

The seat 60 is disposed such that the seat base 60a of the seat 60 is arranged below the position P which is the center of curvature of the curved guide rails 40L and 40R. It is known that, in general, the center of mass of a seated rider is located in the vicinity of the hip of the seated rider. FIG. 3 shows the position GH of the center of mass of the rider 100 being seated in the seat 60. The position GH of the center of mass of the rider 100 can be arranged under the position P of the center of curvature by arranging the seat 60 such that the seat base 60a of the seat 60 is allocated under the position P of the center of curvature of the guide rails 40L and 40R. The position G of the center of mass of the trunk 13 is also positioned vertically under the position P of the center of curvature of the guide rails 40L and 40R. It is also possible to have the center of mass of the trunk 13, including that of the rider 100, positioned under the position P of the center of curvature. Therefore, similar to the above explanation, in a case where the inclination angle of the legged robot 10a in the front or rear direction increases for some reason, the legged robot 10a can prevent the trunk 13 with the rider 100 on board from overturning by allowing free motion of the sliding joints 16L and 16R.

As described above, specific examples of the present invention are explained, but these are simply illustrations, and do not limit the scope of the claims. The technology that is recited in the claims includes modifications and variations of the specific examples that have been illustrated above.

In the embodiments, as shown in FIG. 1, the leg 14L (14R) uses the combined joint 26L (26R) that is composed of the roll joint 30L (30R) and the pitch joint 32L (32R). However, the roll joint 30L (30R) and the pitch joint 32L (32R) may be connected in series by separate links. Same modification can be applied to the other combined joint 28L (28R).

In addition, in the above embodiments, a legged robot having a pair of legs 14L and 14R is provided as mere example. The number of legs is not limited to a pair. The present invention can also be applied to a legged robot that has three or more legs.

While the present invention can be applied to a legged robot that has three or more legs, applying the present invention in particular to a legged robot having a pair of legs is particularly advantageous. The reason is that it is possible to allocate the roll joints that are possessed by the legs to be within the width of the trunk when viewed from the lateral direction. In a legged robot that has a pair of legs, a state occurs in which the legged robot stands only with one leg while walking. Thus, moment is generated at the roll joint(s) of the leg that supports the trunk due to the trunk's own weight. Each of the roll joints of the leg that support the trunk must output a torque that is equivalent to this moment. By allocating the roll joint(s) that is possessed by each leg inward with respect to the sides of the trunk when viewed from the lateral direction, the moment by which generated from the own weight of the robot and of which acts upon the roll joint(s) of the leg can be made small. A legged robot according to the present invention can walk with long steps while keeping the height of the trunk low, and at the same time, the legged robot can make small the moment that acts on the roll joint(s) possessed by the leg joint and is generated by the trunk's own weight.

Furthermore, in the legged robot of the above embodiments, the sliding joints are disposed along the bottom surface of the curved trunk in the front and rear direction. In the layout of the curved guide rails extending on the bottom surface of the trunk so as to project downward from the trunk, it is not absolutely necessary that the bottom surface of the trunk be curved in the front and rear direction. The guide rails may be attached to the bottom surface of the trunk at several points.

In addition, in the legged robot of the present invention, the sliding joints that connect the trunk and the pair of legs so as to be able to slide the legs with respect to the trunk are not limited to the curved slide joints. Linear sliding joints may be employed as sliding joints that slide the legs in the front and rear direction of the trunk.

In addition, in the above embodiments, the sliding joints 16L and 16R are provided on the bottom surface of the trunk 12. However, each of the pair of sliding joints 16L and 16R may be provided on each sides of the body of the trunk 12 in correspondence to each leg of the pair of legs. Even in the employment of the aforesaid configuration, it is possible to realize a legged robot that can walk with large steps while keeping the height of the trunk low.

The technical elements that are explained in the present specification and the figures exhibit a technical utility singly or in various combinations, and are not limited to the combinations that are recited in the claims at the time of the filing. In addition, the technology that is illustrated in the present specification and the figures can obtain a plurality of objects simultaneously, and, the technology disclosed herewith possesses a technical utility value solely by attaining one of such objects.

What is claimed is:

1. A legged robot comprising:
   a trunk;
   a pair of legs; and
   a pair of sliding joints, each of the sliding joints connects one end of each of the legs to the trunk such that each leg is able to slide in a front and rear direction with respect to the trunk;
   wherein each of the sliding joints curves such that a center of curvature is positioned above the sliding joints.

2. The legged robot as in claim 1, wherein each of the sliding joints is arranged on either side surface of the trunk.

3. The legged robot as in claim 1, wherein the pair of sliding joints is arranged on a bottom surface of the trunk.

4. The legged robot as in claim 1, wherein:
   each of the legs has at least one roll joint having rotation axis extending along the front and rear direction with respect to the trunk; and
   the roll joint is positioned below the trunk and is positioned within a width of the trunk.

5. The legged robot as in claim 1, wherein each of the sliding joints curves in a circular arc.

6. The legged robot as in claim 1, wherein the center of curvature of each of the sliding joints is positioned above a center of mass of the trunk.

7. The legged robot as in claim 6, further comprising a seat in the trunk, wherein a seat base of the seat is positioned below the center of curvature of each of the sliding joints.

8. A legged robot comprising:
a trunk;
a pair of legs, each of the legs having at least one roll joint that has a rotation axis extending along a front and rear direction with respect to the trunk; and
a pair of sliding joints, each of the sliding joints being arranged on a bottom surface of the trunk and connecting one end of each of the legs to the trunk such that each of the legs is able to slide along the front and rear direction with respect to the trunk; wherein
the roll joint is positioned below the trunk and is positioned within a width of the trunk.

* * * * *